US012178761B2

(12) United States Patent
Irving et al.

(10) Patent No.: US 12,178,761 B2
(45) Date of Patent: Dec. 31, 2024

(54) CHAIR PRESET ICON SYNCHRONIZATION

(71) Applicant: A-dec, Inc., Newberg, OR (US)

(72) Inventors: Michael John Irving, Newberg, OR (US); Jason Joel Alvarez, Newberg, OR (US); Daryl Wayne Freier, Newberg, OR (US); Scott Andrew McClelland, Newberg, OR (US); Bradley Jamin Nelson, Newberg, OR (US); Brett Douglas Peterson, Newberg, OR (US)

(73) Assignee: A-dec, Inc., Newberg, OR (US)

( * ) Notice: Subject to any disclaimer, the term of this patent is extended or adjusted under 35 U.S.C. 154(b) by 232 days.

(21) Appl. No.: 17/697,497

(22) Filed: Mar. 17, 2022

(65) Prior Publication Data

US 2023/0293376 A1  Sep. 21, 2023

(51) Int. Cl.
*A61G 15/02* (2006.01)
*G06F 3/04817* (2022.01)
*G06F 3/0488* (2022.01)
*G06F 3/0482* (2013.01)
*G06F 3/04847* (2022.01)

(52) U.S. Cl.
CPC ......... *A61G 15/02* (2013.01); *G06F 3/04817* (2013.01); *G06F 3/0488* (2013.01); *A61G 2203/20* (2013.01); *G06F 3/0482* (2013.01); *G06F 3/04847* (2013.01)

(58) Field of Classification Search
CPC ............... A61G 15/02; A61G 2203/20; G06F 3/04817; G06F 3/0488; G06F 3/0482; G06F 3/04847

USPC .......................................................... 433/33
See application file for complete search history.

(56) References Cited

U.S. PATENT DOCUMENTS

| 10,614,694 | B1* | 4/2020 | Zwier | G08B 21/0461 |
|---|---|---|---|---|
| 11,484,451 | B1* | 11/2022 | Nahavandi | A61G 7/005 |
| 2002/0059679 | A1* | 5/2002 | Weismiller | A61G 7/0514 |
| | | | | 5/610 |
| 2002/0149248 | A1* | 10/2002 | Jackson | F15B 7/02 |
| | | | | 297/330 |

(Continued)

FOREIGN PATENT DOCUMENTS

WO   WO-2023178145 A1 *  9/2023  ............. A61G 15/02

OTHER PUBLICATIONS

RD-675058-A, Jul. 10, 2020, RD.*

(Continued)

*Primary Examiner* — Matthew M Nelson
(74) *Attorney, Agent, or Firm* — Schwabe, Williamson & Wyatt, P.C.

(57) ABSTRACT

Systems and methods for synchronizing icons across interfaces for a dental chair are disclosed. In embodiments, a dental chair has a first interface and a second interface. Each interface includes a plurality of icons that graphically depict a stored position that can be actuated to command the chair to the stored position. The chair's position may be adjusted, and the adjusted position stored to one of the icons. Upon storage, the corresponding icon on both the first and second interfaces are updated to graphically depict the new stored position. Profiles that allow selection of different sets of stored positions may be provided. Other embodiments may be described and/or claimed.

20 Claims, 7 Drawing Sheets

(56) References Cited

U.S. PATENT DOCUMENTS

| | | | |
|---|---|---|---|
| 2003/0071503 A1* | 4/2003 | Brockway | A61G 15/02 297/330 |
| 2004/0011779 A1* | 1/2004 | Krywiczanin | A61G 7/0519 219/217 |
| 2004/0183352 A1 | 9/2004 | Schron | |
| 2007/0035164 A1* | 2/2007 | North | A47C 7/70 297/217.1 |
| 2008/0220391 A1* | 9/2008 | Temple | A61G 5/12 433/101 |
| 2008/0235872 A1* | 10/2008 | Newkirk | A61G 7/0524 5/658 |
| 2010/0176632 A1 | 7/2010 | Alford | |
| 2010/0212087 A1* | 8/2010 | Leib | A61G 12/00 5/81.1 R |
| 2012/0184410 A1* | 7/2012 | Foster | A63B 21/023 482/92 |
| 2012/0215360 A1* | 8/2012 | Zerhusen | A61G 7/018 700/275 |
| 2017/0172828 A1* | 6/2017 | Zerhusen | A61G 7/001 |
| 2018/0085271 A1* | 3/2018 | Lim | A61G 15/02 |
| 2018/0161225 A1* | 6/2018 | Zerhusen | A61G 7/05 |
| 2018/0352959 A1* | 12/2018 | Zhang | A47C 1/03 |
| 2018/0369037 A1* | 12/2018 | Desaulniers | A61G 7/018 |
| 2019/0046376 A1 | 2/2019 | Chiacchira | |
| 2019/0307628 A1* | 10/2019 | Park | A61B 8/4433 |
| 2020/0188204 A1 | 6/2020 | Newkirk | |
| 2020/0214449 A1 | 7/2020 | Paul | |
| 2021/0000669 A1* | 1/2021 | Meyer | A61G 7/05792 |
| 2021/0236357 A1 | 8/2021 | Upchurch | |
| 2021/0251579 A1* | 8/2021 | Nahavandi | A61B 5/6892 |
| 2022/0202545 A1* | 6/2022 | Irving | A61C 17/0205 |
| 2023/0293376 A1* | 9/2023 | Irving | G06F 3/0488 433/33 |

OTHER PUBLICATIONS

Planmeca Compact i5 User's Manual, Publication No. 30011782, Rev. 10, released Jan. 10, 2022; 338 pages.

International Search Report and Written Opinion in PCT/US2023/064388 dated Jul. 12, 2023; 13 pages.

Fajrin, "Dental Unit Prototype with Electric Dental Chair and Dental Light Parameters", Proceedings of the 4th International Conference on Sustainable Innovation 2020—Technology, Engineering and Agriculture (ICoSITEA 2020); retrieved on May 31, 2023; retrieved from the Internet <URL: https://ww.atlantis-press.com/article/125952568.pdf> entire document.

Fajrin, "Dental Unit Prototype with Electric Dental Chair and Dental Light Parameters", Proceedings of the 4th International Conference on Sustainable Innovation 2020—Technology, Engineering and Agriculture (ICoSITEA 2020); retrieved on May 31, 2023; retrieved from the Internet <URL: https://www.atlantis-press.com/article/125952568.pdf> entire document.

* cited by examiner

NON-TRANSITORY COMPUTER-READABLE STORAGE MEDIUM
1602

PROGRAMMING INSTRUCTIONS 1604,
CONFIGURED TO CAUSE A DEVICE, IN RESPONSE TO EXECUTION
OF THE PROGRAMMING INSTRUCTIONS, TO PRACTICE (ASPECTS
OF) EMBODIMENTS OF THE PROCESS(ES) DESCRIBED
THROUGHOUT THIS DISCLOSURE.

FIG. 8

CHAIR PRESET ICON SYNCHRONIZATION

TECHNICAL FIELD

Disclosed embodiments are directed to operating interfaces for dental equipment, and in particular to interfaces for adjustable dental chairs.

BACKGROUND

For most dental work, the patient sits in a chair that is specially configured for the practice of dentistry. Such a chair may be equipped to a variety of accessories and implements used in dentistry, e.g. dental handpieces, ultrasonic scalers, air/water syringes, intraoral cameras, suction instruments, cuspidors, and operating lights, to name a few possible implements. The chair is typically adjustable, for example manually or via actuator systems such as electro-mechanical or hydraulic, in several different degrees. For example, the chair may be height-adjustable and recline-adjustable, so that a dentist can position the patient suitably for a given dental procedure, taking into consideration the dentist's comfort and ease in working. The types of controls used for adjustment may vary widely depending upon the configuration of a given chair and its equipped features. Where a chair is adjusted with an actuation system, the actuation system of the chair may be equipped with a controller that offers the ability to store positions and command the chair to the stored positions.

The background description provided herein is for the purpose of generally presenting the context of the disclosure. Unless otherwise indicated herein, the materials described in this section are not prior art to the claims in this application and are not admitted to be prior art by inclusion in this section.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 8 is a block diagram of a computer-readable storage medium that can be used to implement some of the components of the system or methods disclosed herein, according to various embodiments.

DETAILED DESCRIPTION

Figure 1:
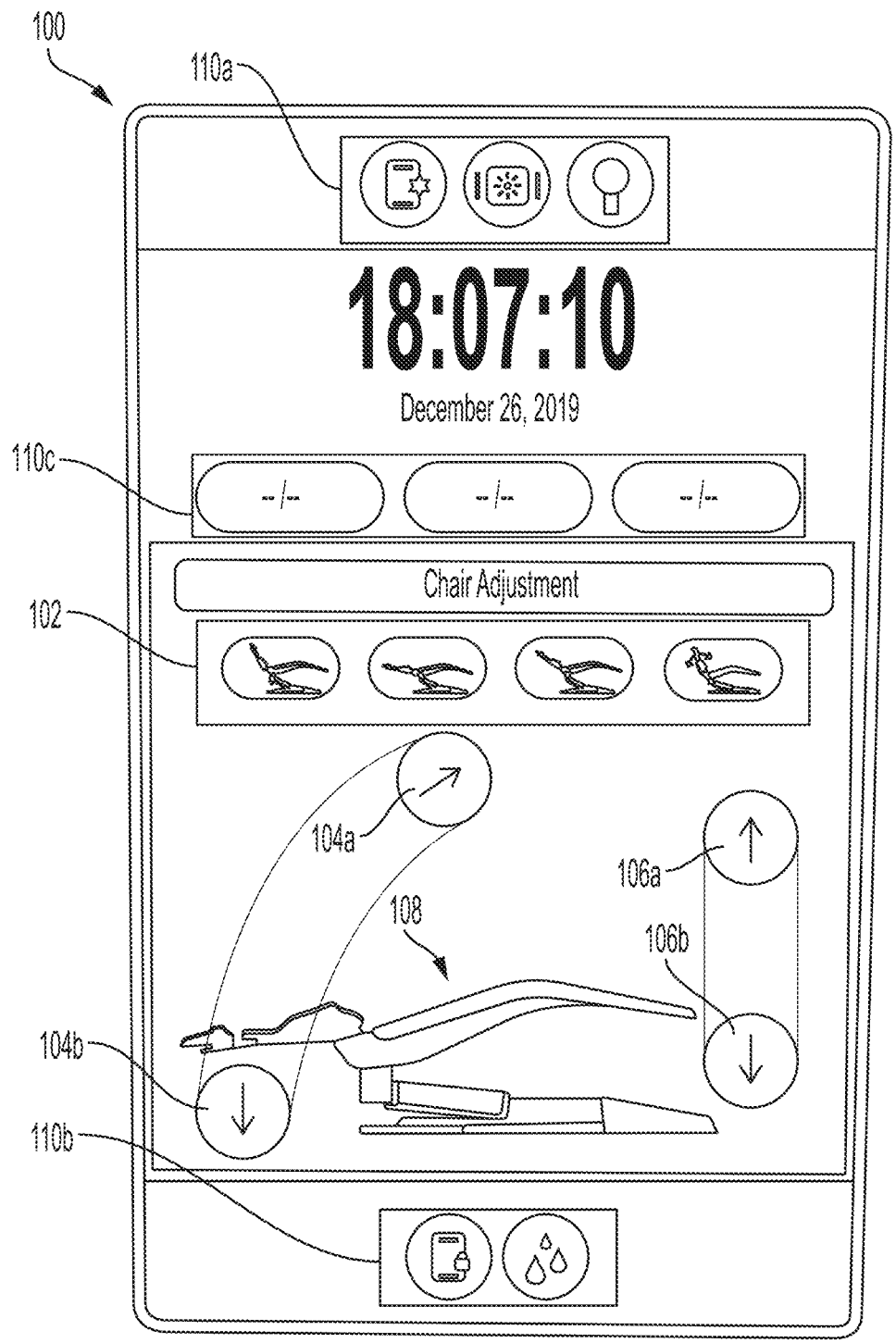
FIG. 1 illustrates a first example interface for an adjustable dental chair with a touchscreen that includes icons that reflect stored chair position presets, according to various embodiments.

In the following detailed description, reference is made to the accompanying drawings which form a part hereof wherein like numerals designate like parts throughout, and in which are shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. In embodiments, "connected" may be used to indicate that two or more elements are in some way arranged so that they can interact with each other, including electrically connected, such as over a data communications link, or wirelessly connected, such as over a wireless communications link. "Coupled" may mean, in embodiments that two or more elements are in direct physical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous, and are generally intended as "open" terms (e.g., the term "including" should be interpreted as "including but not limited to," the term "having" should be interpreted as "having at least," the term "includes" should be interpreted as "includes but is not limited to," etc.).

Call-outs for components that are present in multiples may be numbered identically, with a letter suffix distinguishing each instance of the multiple component. For example, where a component 1 is present multiple times in a figure, each instance of component 1 may be designated 1*a*, 1*b*, 1*c* . . . 1*x*. Referring to a component by its call-out without the letter, e.g. component 1, should be understood to refer to any or all instances of component 1*a*-1*x*, while reference to a specific instance of a component 1 will include its letter, e.g. component 1*b*.

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

Existing adjustable chairs, when motorized, may be in communication with an interface that allows the electronic storage and retrieval of chair positions. As used herein, "motorized" refers to any chair that may be adjusted by actuators that can be controlled by a controller or control unit in communication with the chair, without regard to the nature of the actuating mechanism (e.g. electro-hydraulic, electro-pneumatic, electro-mechanical, etc.). The controller or control unit may in turn, depending upon the specifics of a given embodiment, be in communication with and/or generate the aforementioned interface, with which a user can direct the controller or control unit to effect adjustment of the chair. Where a chair is described as being commanded to a particular position, it should be understood that the mechanics for how such adjustments to the chair are made will depend upon the specifics of a given implementation, i.e. the chair interface may directly control or drive the relevant chair actuators, or the interface may instead provide instructions to a controller or control unit configured to the chair, as described above. The specific format of such communications or instructions will depend upon the specifics of a given implementation.

A dentist using such a chair can set the chair, via the interface, into a desired position that is used repeatedly and store that position as a preset within or presented by the interface, so that the chair can easily be commanded back to the preset position from the interface when the chair has been repositioned, such as by other dentists and/or dental staff, because different procedures may require different chair positions, or because different dentists/assistants have different preferences. Where the interface provides multiple memory presets, the various memory presets could be allocated to different dentists and/or to differing positions that correspond to different types of procedures, e.g. one preset may be used for entry/exit, another preset may be used for working on the upper arch, another position may be used for working on the lower arch, etc.

Existing adjustable chair interfaces are deficient in several aspects, however. Known chair interfaces typically denote memory presets with a generic identifier, such as a number or letter, which provide no indication as to the actual stored position, e.g. whether it is more prone or upright, chair height, etc. Other known interfaces may only provide a static, generic indication of a general position, such as upright, prone, or some intermediate position. These generic indications may bear little resemblance to the actual stored positions, particularly if the user pays no heed to storing a position that roughly matches the generic indications, or if the chair interface's controls do not enforce storing positions that somewhat approximate the generic indications.

Disclosed embodiments address these deficiencies by providing a chair interface that has dynamic icons to denote chair position memory presets. The icons reflect the actual stored chair position, with the icon changing to match a new stored position. Thus, a user of the chair interface is provided with a relatively accurate depiction of the position into which the chair will be configured if a given memory preset is triggered or actuated, and can be aided in identifying a particular stored position for a given practitioner and/or procedure.

Further, the chair interface and/or associated inputs that may be in communication with the interface may allow for storing of multiple profiles, with each profile including its own set of stored presets. Where a practice has multiple practitioners, each practitioner can have access to their own set of custom presets. In some embodiments, a practitioner (or related support staff) can select from a number of profiles using the chair interface, such as from a drop-down box, radio button, or other toggle or control offering selection functionality. In other embodiments, the practitioner may login to the interface, such as by providing some form of login credentials. By logging into a given chair interface with their profile, a practitioner's stored presets may be made available on the interface, allowing both an expansion to additional stored presets and easing management of preferences for multiple practitioners. In some embodiments, these multiple profiles may be stored on the interface, or may be stored in a controller board for the chair in communication with the interface where the controller board is not integrated with the interface. Still further, in some embodiments the chair interface or control board may be configured to communicate over a network with one or more various devices that are distinct or separate from the chair interface or control board. Other possible embodiments will be described herein.

Interfaces

FIG. 1 illustrates a first example interface 100. Interface 100 includes a plurality of icons 102 that correspond to stored positions of an adjustable chair controlled by interface 100. The chair may be directly adjusted using a plurality of adjustment controls 104*a*, 104*b*, which control the incline of the backrest in the depicted embodiment, and controls 106*a* and 106*b*, which control the seat height. The current chair position is reflected in a graphical depiction 108, which updates as the position of the chair is adjusted. Interface 100 may further have one or more additional controls 110*a*, 110*b*, to access useful features such as timers and/or to control various accessories attached to or in communication with the chair, its control board, and/or interface 100. The interface 100 further may display one or more additional features such as the date and time, any running timers, system status, or other useful information. Interface 100, in the depicted embodiment, is presented on a touch-sensitive screen, such that buttons can be represented graphically as screen locations that can be pressed.

Plurality of icons 102, as can be seen in the example embodiment of FIG. 1, each reflect a different stored setting of a chair position. As interface 100 is implemented using a touch-sensitive screen in the depicted embodiment, each icon 102 also serves as a button for commanding the chair to the stored position that is illustrated by the icon 102. Thus, tapping or pressing the icon 102 commands the interface 100 to adjust the position of the chair, or command the chair's control board to adjust the position of the chair, to match the graphical depiction of the actuated icon 102. Whether the interface 100 directly commands the chair's actuators to the stored position or provides stored position information to a control board depends upon the specifics of a given implementation. While plurality of icons 102 depicts four icons, other embodiments may have fewer or more icons.

Further, in some embodiments, one of the icons 102 may be dedicated to a toggle function that commands the chair from any current first position to a programmed position when the associated icon is tapped or pressed once, and commands the chair from that programmed position back to the first position when tapped or pressed a second time. The programmed position may be preset into the chair's control board or the chair interface, and/or may be subsequently modified by a practitioner similar to the other presets associated with each icon 102 to a practitioner's preferred position. Such a toggle function can be useful for positioning the chair so that an X-ray of the patient may be taken or so that the patient may use a cuspidor (also known as a spittoon) and then return the chair to its previous position so that the practitioner may resume patient treatment. The toggle function may be configured such that only one adjustable aspect of the chair (e.g., the chair backrest) is repositioned to the programmed position when the associated icon is tapped or pressed once, while leaving any other adjustable aspects of the chair (e.g., the seat height) in their respective first position. Alternatively, the toggle function may be configured such that multiple adjustable aspects, up to all possible adjustable aspects or some subset thereof, of the chair are repositioned to the programmed position when the associated icon is tapped or pressed once.

In various embodiments, the toggle function icon may display the programmed position prior to being pressed once, and then may update to display the previous position of the chair after being tapped or pressed once. The toggle function icon may revert to display the programmed position after being tapped or pressed a second time. Alternatively, the toggle function icon may remain fixed when pressed once or twice, only displaying the programmed position to which the chair is commanded when pressed once when not already in the programmed position. In still other embodiments, the toggle function icon may be a static icon that may indicate that it is for toggling the chair to an X-ray/cuspidor position when pressed once and returning to the previous position when pressed a second time, but not otherwise indicate or reflect the actual position to which the chair would be commanded when pressed once or the position that would be recalled when pressed a second time.

Regardless of whether a stored position is commanded by actuating an icon 102, in embodiments, the chair position may be manually adjusted at any time. Interface 100 may provide touch controls for making manual adjustments, such as controls 104a, 104b, 106a, and 106b. As mentioned above, controls 104a and 104b may raise or lower the angle of the backrest, respectively, and controls 106a and 106b may raise or lower the seat height, respectively. When such controls are actuated, depiction 108 of the chair may adjust to provide a real-time depiction of the actual configuration of the chair. This depiction 108 may also form the basis of the graphical depiction for the stored position of each icon 102, as will be described in greater detail below. While interface 100 is equipped with manual controls for two degrees of chair movement (backrest tilt and seat height), other embodiments may have fewer or more manual controls corresponding with fewer or additional degrees of motion or adjustable aspects of a given chair, including the chair's headrest, armrests and/or other portions of the chair, to which interface 100 may be equipped.

Additional controls 110a, 110b, and/or 110c may further be provided. The number and type of additional controls 110 may depend upon the particular accessories and/or features configured to a given chair. In the depicted example, controls 110a and 110b are docked to the top and bottom of the interface 100, respectively, and may be configured to allow interface adjustments, chair configuration, system setup, profile switching, instrument control and configuration, system status, and/or access to any other necessary or convenient configuration or adjustment. Some controls, such as controls 110c, may provide other functionality, such as one or more timers for procedures. The additional controls may be implemented as icons or another suitable graphic device, depending on the capabilities of the screen of interface 100.

Figure 2:
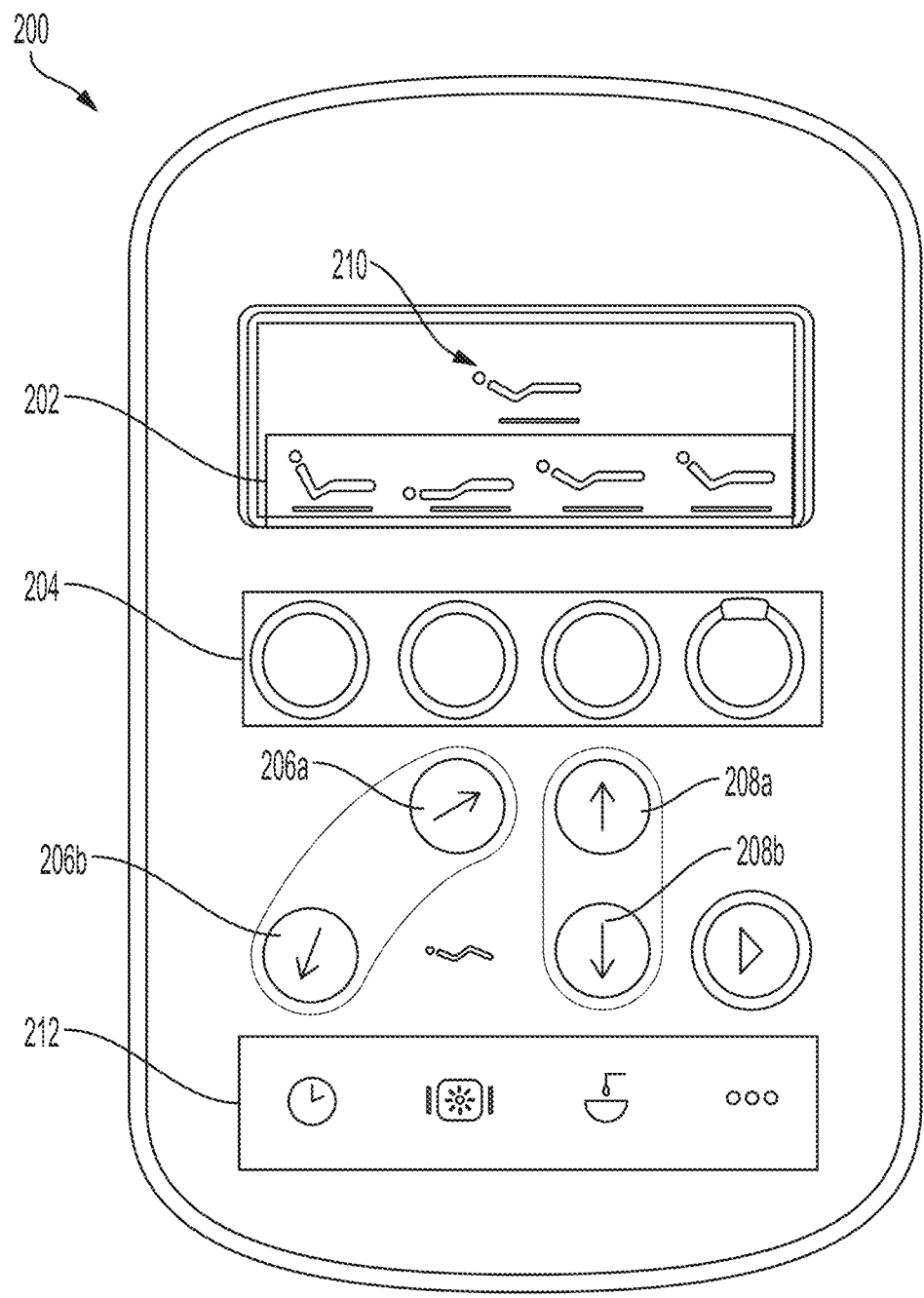
FIG. 2 illustrates a second example interface for an adjustable dental chair that includes icons corresponding to separate buttons for adjusting the chair to previously stored positions, the icons reflecting stored chair position presets associated with the corresponding button, according to various embodiments.

FIG. 2 illustrates a second example interface 200, according to various embodiments. As will be discussed below, in some implementations, a chair may be equipped with or connected to both interface 100 as well as interface 200, with interface 100 typically being used by a dentist or doctor, and interface 200 being used by an assistant. Similarly, a chair may be equipped with or connected to more than one interface 100 or more than one interface 200. Interface 200 may be equipped with controls that are substantially similar to those of interface 100. In the depicted embodiment, interface 200 includes a plurality of icons 202 that correspond to the plurality of icons 102, adjustment buttons 206a, 206b, 208a, and 208b that correspond to adjustment controls 104a, 104b, 106a, and 106b, respectively, and additional controls 212 that correspond to additional controls 110a and 110b of interface 100. Depiction 108 of the chair corresponds to depiction 210. Depending upon the implementation, additional controls 212 may include only a subset of the functions provided by additional controls 110.

In some embodiments, interface 200, in contrast to interface 100, may be implemented using a non-touch sensitive screen and a set of buttons that are separate from the screen. While the depicted embodiment of interface 200 is implemented using capacitive or membrane style buttons, other embodiments may use any suitable technology for implementing the controls, e.g. a touch sensitive screen, mechanical buttons, momentary or toggle switches, dials, sliders, or any other control suitable to the aspects of the chair being controlled, and that may be used in a dental or medical setting. Thus, while a plurality of icons 202 are illustrated as not being touch-sensitive, they each correspond to one of a plurality of buttons 204, and in the depicted embodiment each are positioned directly below one of the plurality of icons 202 to indicate the icon to button correspondence. As may be noted, one of the plurality of buttons 204 has a light to indicate its activation, viz. the light indicates that the icon corresponding to the selected button illustrates the current configuration of the chair. Selection of one of the icons 202 (by depressing its corresponding button 204) or adjustment of the chair via the manual adjustment buttons 206a, 206b, 208a, or 208b may cause the graphic depiction 210 to update to reflect the current chair configuration. As with interface 100, one of the icons 202 and its corresponding button 204 may be dedicated as a programmed setting toggle button, e.g. for X-ray/cuspidor position.

As discussed above, the depicted embodiments illustrate interface 100 as implemented using a touch screen and interface 200 implemented using a non-touch screen and corresponding buttons/controls. In other embodiments both interface 100 and interface 200 may be implemented using a touch screen interface, wherein the touch screen of interface 200 may be similar to or differ from the touch screen of interface 100, or interface 100 may be implemented using a non-touchscreen interface with corresponding buttons/controls with interface 200 implemented using a touch screen, or both interface 100 and interface 200 each being implemented using a non-touchscreen interface.

In some embodiments, interface 100 will be chiefly used by a dentist, and the interface 200 by an assistant. In such embodiments, interface 200 may have a more limited set of controls, as the assistant may not need to have access to the full functionality provided to a dentist or other primary practitioner, e.g. admin tools, profile switching, etc. Both interface 100 and/or interface 200 may be directly connected, e.g. hard wired, to the chair or its control board, or may be connected by another suitable communications technology, such as a wired or wireless data link, as will be discussed below. When so connected, adjustments to stored positions of the plurality of icons 102 will automatically be reflected upon the plurality of icons 202 of interface 200, and vice-versa.

In embodiments, it may be preferred to have interface 100 and/or interface 200 physically coupled to, or in close proximity, to the chair. However, in embodiments, one or more of the interface 100 and interface 200 may be decoupled from the chair, but remain connected, and instead accessible in other areas of the operatory (such as on a wall, counter, desk, or cabinetry) in certain situations.

Although not depicted in FIG. 1 or 2, interface 100 and interface 200 may communicate with the chair and/or an attached controller or control board via a suitable networking technology. In some embodiments, interface 100 and/or interface 200 may connect to the chair, any control board, and each other using a local networking technology such as CANBUS. Other suitable methods of communication may include other cabled networking technologies such as Ethernet or fiber optics, or wireless technologies such as WiFi, Bluetooth, or another suitable networking protocol. In still other embodiments, a combination of technologies and/or protocols may be employed. Still further, interface 100 and/or interface 200, as well as other components of an operatory such as the chair and any associated control board, may be capable of data communication with other discrete devices, such as over a suitable data network.

Preset Actuation and Icon Synchronization

Figure 3:
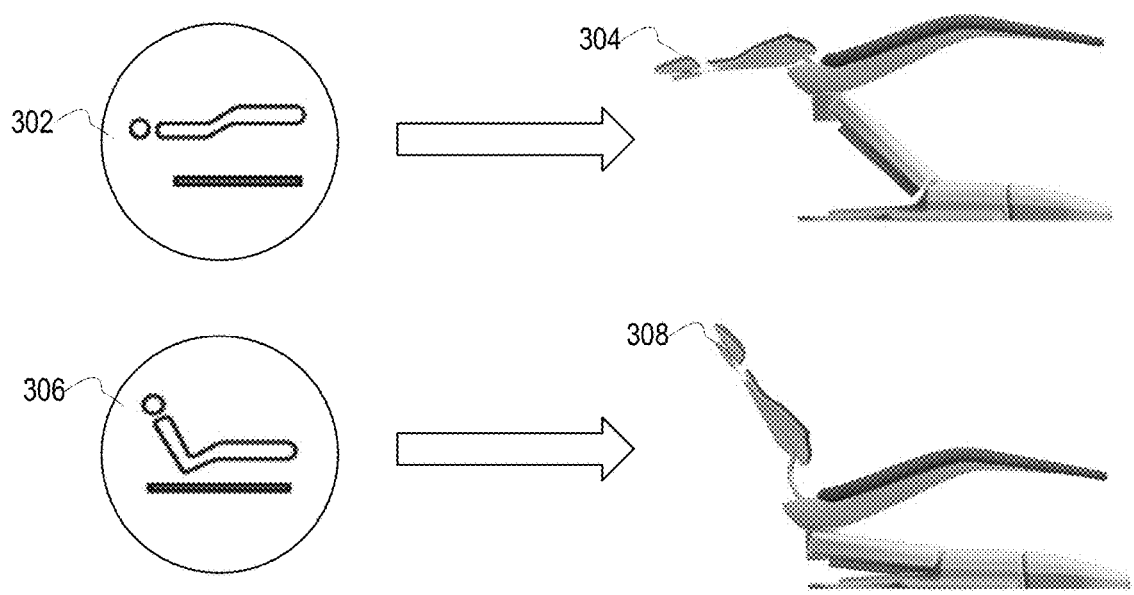
FIG. 3 illustrates several example icons that reflect stored chair positions, according to various embodiments.

FIG. 3 illustrates a plurality of icons that each graphically depict a representation or approximation of a stored chair position, comparable to one of the icons in the plurality of icons 102 and 202 associated with interface 100 and/or interface 200, respectively. Icons 302 and 306 each depict a chair position that is stored. Actuating or depressing icon 302 or 306 if a touchscreen, or corresponding buttons if a non-touchscreen interface, will cause the chair associated with the interface to assume the position depicted on each respective icon. Thus, actuating icon 302 will place a chair into configuration 304, and actuating icon 306 will place the chair into configuration 308. As can be seen, configuration 304 is substantially identical to the depiction in icon 302, and configuration 308 is substantially identical to the depiction in icon 306. Icons 302 and 306 may each be a part of a plurality of icons of stored positions, such as plurality of icons 102 or 202, and may be reprogrammed with different stored positions, as will be described below with respect to FIG. 5.

Figure 4:
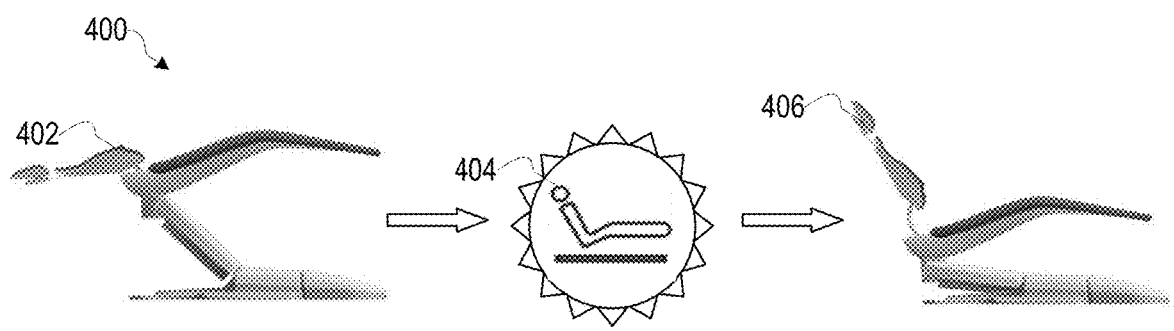
FIG. 4 illustrates the function of an icon reflecting a stored chair position in commanding a dental chair to the stored position, according to various embodiments.

FIG. 4 illustrates the process flow 400 when one of a plurality of icons such as plurality of icons 102 or 202, or one of the corresponding plurality of buttons 204, is selected to configure the chair into the position indicated by the selected icon. A chair is in a first configuration 402 with the seat height relatively high and backrest at a reclined angle. Icon 404 is selected, either by depressing the icon on a touch screen interface, or depressing the corresponding button on a non-touch screen interface. Following selection, the interface commands the chair (or a control board or module connected to the chair and in communication with the interface) to assume the position that is reflected in icon 404. Thus, the chair assumes second configuration 406, identical to the icon 404 depiction, with the backrest raised to a more upright angle and the seat height relatively low.

Figure 5:
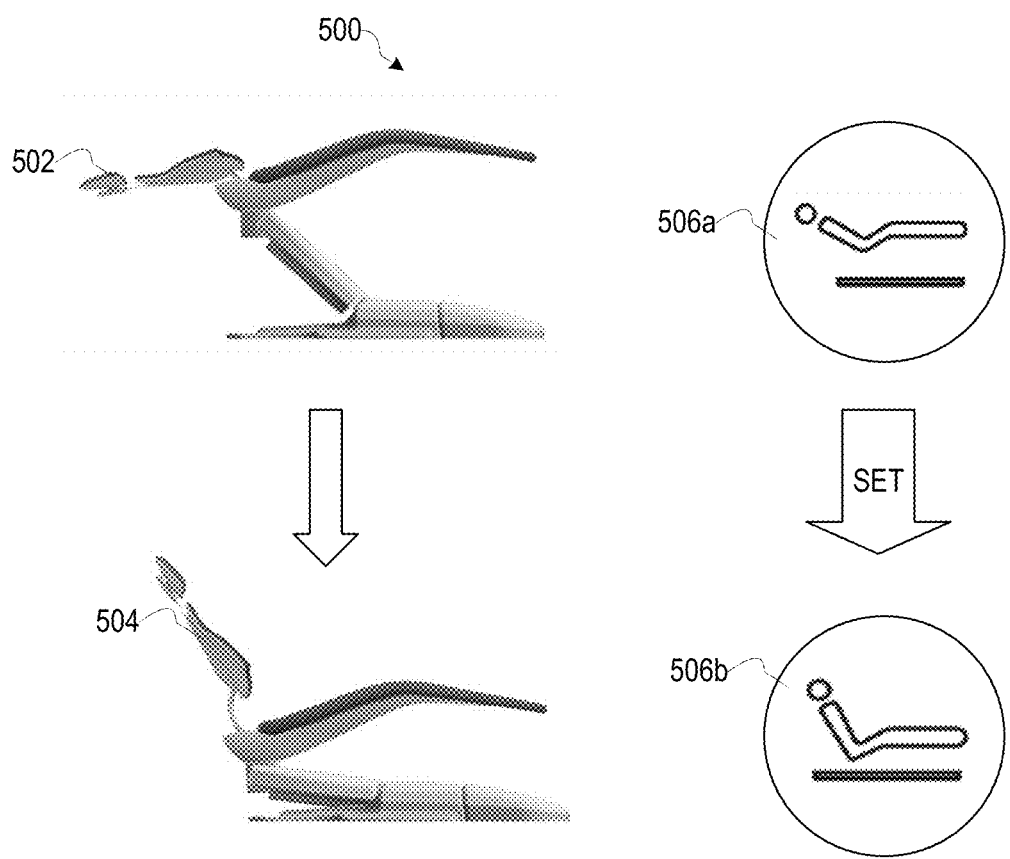
FIG. 5 illustrates the process flow for adjusting a chair position and how storing the adjusted position alters the icon associated with the stored position, according to various embodiments.

FIG. 5 illustrates the process flow 500 by which the icon depicting a stored chair position is updated when the existing stored chair position is overwritten by a new position. In process flow 500, a chair in a first configuration 502 is actuated, such as with adjustment controls 104 and 106, or adjustment buttons 206 and 208, to place it into second configuration 504. An icon 506 indicates a first stored position 506a, different from either first configuration 502 or second configuration 504. As will be understood, actuating icon 506 when it indicates first stored position 506a will cause the interface to command the chair to move to the stored position 506a. In some embodiments, upon actuating icon 506 the interface signals the control board (or controlling interface in implementations where an interface and control board are integrated or otherwise combined) of the selected preset, at which point the control board commands the chair to the preset position using its stored preset position information; the signaling interface only indicates which preset was selected.

A user may decide to save the second configuration 504, following adjustment of the chair with the adjustment controls, to the icon 506, overwriting its current stored position. Once the user selects to set a new configuration icon 506, such as second configuration 504, the position of the chair in second configuration 504 overwrites the existing stored position 506a. The icon 506 is accordingly updated to indicate second stored position 506b. As second configuration 504 is saved, icon 506 now reflects this new stored configuration as second stored position 506b, identical to second configuration 504. As will be understood, actuating icon 506 with second stored position 506b will cause the chair to move to the second configuration 504.

It should further be understood that, in some embodiments where an icon is configured to toggle between the current setting and a pre-programmed setting (e.g. X-ray or cuspidor position), as mentioned above with respect to FIG. 1, the icon may change similar to the process flow 500, but without requiring a user to explicitly set or store the new configuration. Initially actuating such an icon will automatically save the current configuration before the chair is adjusted to the preset configuration. In some embodiments, the icon associated with the preset toggle may also automatically update to graphically depict the previous configuration that is stored. In the context of FIG. 5, if the chair is in configuration 504 and icon 506 is configured to toggle to its preset (different from configuration 504), when actuated to place the chair into the previous configuration, configuration 504 will automatically be stored. Icon 506 may then change to reflect configuration 504. Actuating icon 506 again, without making any intervening adjustments, would thus cause the chair to revert to configuration 504, while icon 506, if updated, would revert to indicate the preset configuration.

Figure 6:
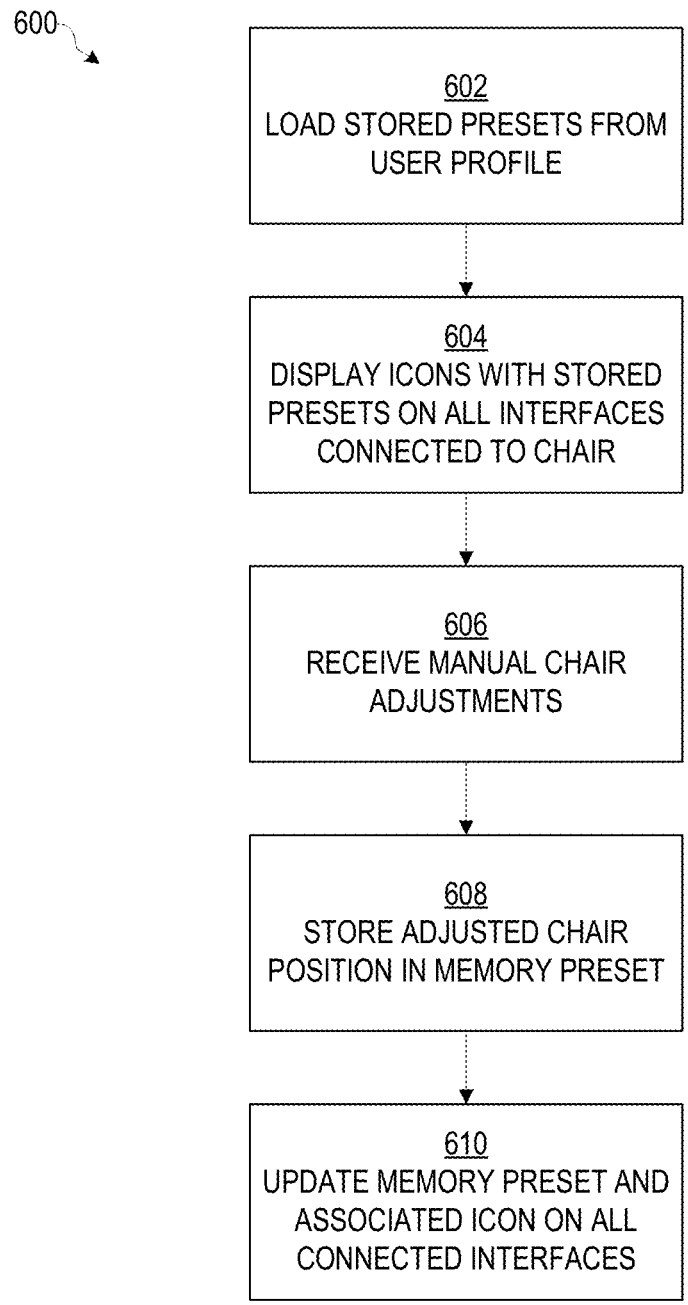
FIG. 6 is a flowchart of the operations of a method for loading and updating icons reflecting stored chair positions, according to various embodiments.

FIG. 6 is a flowchart of the operations of an example method 600 for the storing and updating of an icon with a new chair position preset. Method 600 may be implemented on a dental chair with an interface such as interface 100 and/or interface 200. The operations of method 600 may be performed in sequence or out of sequence, as the operations may permit, operations may be performed in whole or in part, and operations may be omitted or added, depending upon the needs of a given implementation. Method 600 further may be executed on an interface that supports multiple user profiles, where different users can select different profiles, with each profile being associated with a different set of stored chair position presets.

In operation 602, a user of a chair may select a desired profile from an interface, such as interface 100 or interface 200, or via another interface or control terminal. Depending upon the specifics of a given embodiment, the user may simply select a profile on the interface such as from a drop-down list or radio button. In other embodiments, the user may need to supply login or authentication credentials as part of logging into the interface. Once a profile has been selected, in some embodiments the interface signals a control board (or controlling interface) for the chair with the selected user profile. The control board then makes the stored position presets associated with the profile active, and signals any other interfaces attached to or otherwise in communication with the chair control board with the active profile. In embodiments where the interface is combined or integrated with the controller for the chair, the interface may directly signal any other attached interfaces with the active stored profile. It should be understood that when there are no profiles or only one profile, operation 602 may be unnecessary.

Depending on the specifics of a given implementation, the stored position presets may be stored in memory or other suitable storage on the chair controller board, and/or may be stored within the interface accepting the profile selection, particularly when the interface is also acting as the controller for the chair. In some implementations, upon receiving notification of the selected profile, each interface may retrieve from a storage local to the interface any stored presets associated with the signaled active profile and update the interface icons to reflect the stored presets. In such implementations, each interface may independently store the preset information in a memory or storage local to the interface, which may include information useable by the interface to create icons that graphically correspond to each stored preset. In other implementations, the device storing the position presets to command the chair into each preset, e.g. control board, may provide the necessary preset information to some or all attached interfaces once the profile is selected, in addition to or alternative to signaling the active profile. In such implementations, it may be possible to use interfaces that are not equipped with local storage, such as an interface that just provides icons and buttons to signal selected presets, but otherwise relies upon the control board or another interface to provide preset information.

Other arrangements may be possible, e.g. the presets could be stored in a connected separate memory module or storage device, or an attached interface may store the presets and provide them to a chair control board, for example. Furthermore, the information about the stored presets, if transmitted to one or more devices in communication, may vary depending upon the specifics of a given embodiment. As discussed above, the control board or controlling interface may only signal to each interface the selected active profile, in some embodiments. In other embodiments, only information necessary to generate icons that reflect the stored presets may need to be transmitted. In still other embodiments, information sufficient to allow the chair to be commanded to the position preset may be transmitted. In yet other embodiments, the information transmitted may depend upon the receiving device, e.g. a second interface may only need to receive information necessary to generate icons, while a control board may need information to allow the chair to be commanded to position presets, such as where a first interface both receives the profile selection and stores the preset information, but relies upon a control board for chair control that lacks the stored presets.

In operation 604, the interface, once it has received the profile selection, retrieves any information about the stored position presets associated with the profile from its local storage and updates the associated plurality of icons, such as plurality of icons 102 or 202, to graphically depict the various stored position presets. Where the chair is equipped with two (or more) interfaces, such as a dentist interface and an assistant interface, each interface may follow the same procedure, viz. each interface retrieves any stored position preset information associated with the selected profile from its respective local storage and updates its icons accordingly. Depending upon the specifics of a given embodiment, the interface receiving the profile selection directly from the user (e.g. the interface that the user interacts with to select the user profile) may signal to all other connected interfaces the profile selection, and/or may send such selection to a control board, which in turn may signal all connected interfaces. It should further be understood that, as discussed above with respect to operation 602, operation 604 may be unnecessary or greatly simplified in embodiments where stored position preset information is transmitted to the interface from the control board.

As described above with respect to FIG. 5, in embodiments, selection of one of the plurality of icons, such as by actuation of the icon or an associated button, will signal the control board (or controlling interface) of the selection of the associated position preset. The control board will then configure the chair to comport with the selected stored position preset, based on its stored position preset information. Furthermore, upon selection of one of the plurality of icons, the interface receiving the selection from the user may signal the selection to all other interfaces, so that each interface may update to reflect which preset is currently selected. For example, interface 200 may illuminate the light on the button 204 that corresponds to the selected preset, and an interface 100 may change the color of the icon 102 that corresponds to the selected preset.

In various embodiments, each interface locally stores chair position information for each stored position preset for a given profile, and only receives indications of preset selection changes following receipt of the profile selection. In such embodiments, an interface may lack position information for a given stored position preset if the interface has never "seen" the preset before, e.g. the interface is connected to a newly installed chair that has yet to have presets assigned or the interface has just been added to an existing chair and is first being used. In the event that there is no stored position preset information available for a given icon on an interface, such as when the interface is newly installed, a predetermined default image may be displayed for the icon, such as a generic representation of the chair or another graphic device, such as a question mark or dashes, to indicate that the interface lacks information about the stored position preset. Similarly, when a new profile is created in the interface or controller, the default initial position presets may be provided for each icon under the new profile. In such instances, the interface may query the control board about the current position of the chair following selection of a preset to obtain the stored position preset information. Once the interface "sees" the stored position from the control board, it can then store the position information and update the icon associated with the stored position preset.

It will be understood that in embodiments where stored position preset information is transmitted to the interfaces, each interface may rely upon the transmitted preset information to generate the appropriate icons for each stored position preset. In such embodiments, an interface receiving the stored position preset information may not need to query the controller for the current chair position.

In operation 606, the user of the chair may manually adjust the chair if none of the stored position presets are suitable or desired, or a new chair configuration is desired to be stored as a new preset. Manual adjustments may be made via the interface, such as interface 100 or interface 200, using manual adjustment controls such as adjustment icons 104, 106, or adjustment buttons 206, 208. Depending upon the implementation of a given interface, the interface may graphically reflect the current position/configuration of the chair as it is adjusted. Still further, where the chair includes multiple interfaces capable of graphically reflecting the current position/configuration of the chair as it is adjusted, all interfaces may graphically reflect the chair's position as it is adjusted. Updating of the graphical depiction on each of the interfaces may be accomplished in various ways depending upon the specifics of a given implementation. For example, in some embodiments, the control board may broadcast chair position updates to all interfaces, while in other embodiments, each interface may periodically query the control board for current position information.

Once a desired configuration of the chair is obtained, in operation 608, the new position may be stored as a preset associated to one of the plurality of icons on the interface, such as plurality of icons 102 or 202. A user may, via the interface, select a desired icon into which to store the new preset. Upon selection of the desired icon indicating that a new preset is to be stored, the interface receiving the selection will signal to the control board (or controlling interface) that the new chair position is to be stored into the stored position preset that corresponds with the selected icon, in embodiments. If position preset corresponding to the icon selected for storage has a previously stored preset, the new position to be stored overwrites the previously stored position preset. Storing of the new position may be accomplished by any method suitable for the interface being used. In some implementations, the icon (or corresponding button) to which the new configuration is to be saved is pressed and held for a predetermined period of time (such as 1-5 seconds), until the icon updates to reflect the new configuration, indicating the new configuration has been saved as a new preset. In other implementations, a specific key, button, or combination of presses may be entered to indicate the intention to store the new configuration, and to which icon the configuration is to be stored. The interface may further update accordingly to reflect the chair being in a stored position preset. For example, an interface 200 may light up the adjustment button associated with the icon of the newly saved position preset.

Finally, in operation 610, each connected interface may receive notification from the chair control board or controlling interface that the chair has been positioned at a stored position preset, and so obtain the current chair position data from the control board or interface. Each connected interface may then store the updated position preset into its local storage. The icon on all interfaces connected to the chair associated with the updated position preset are then updated to reflect the new stored configuration, so that the new configuration can be readily identified in subsequent uses of the chair. It should be understood that operation 610 may be simplified or rendered moot in embodiments where stored position preset information is distributed or broadcast from the control board to the interfaces.

Computer Systems and Software

Figure 7:
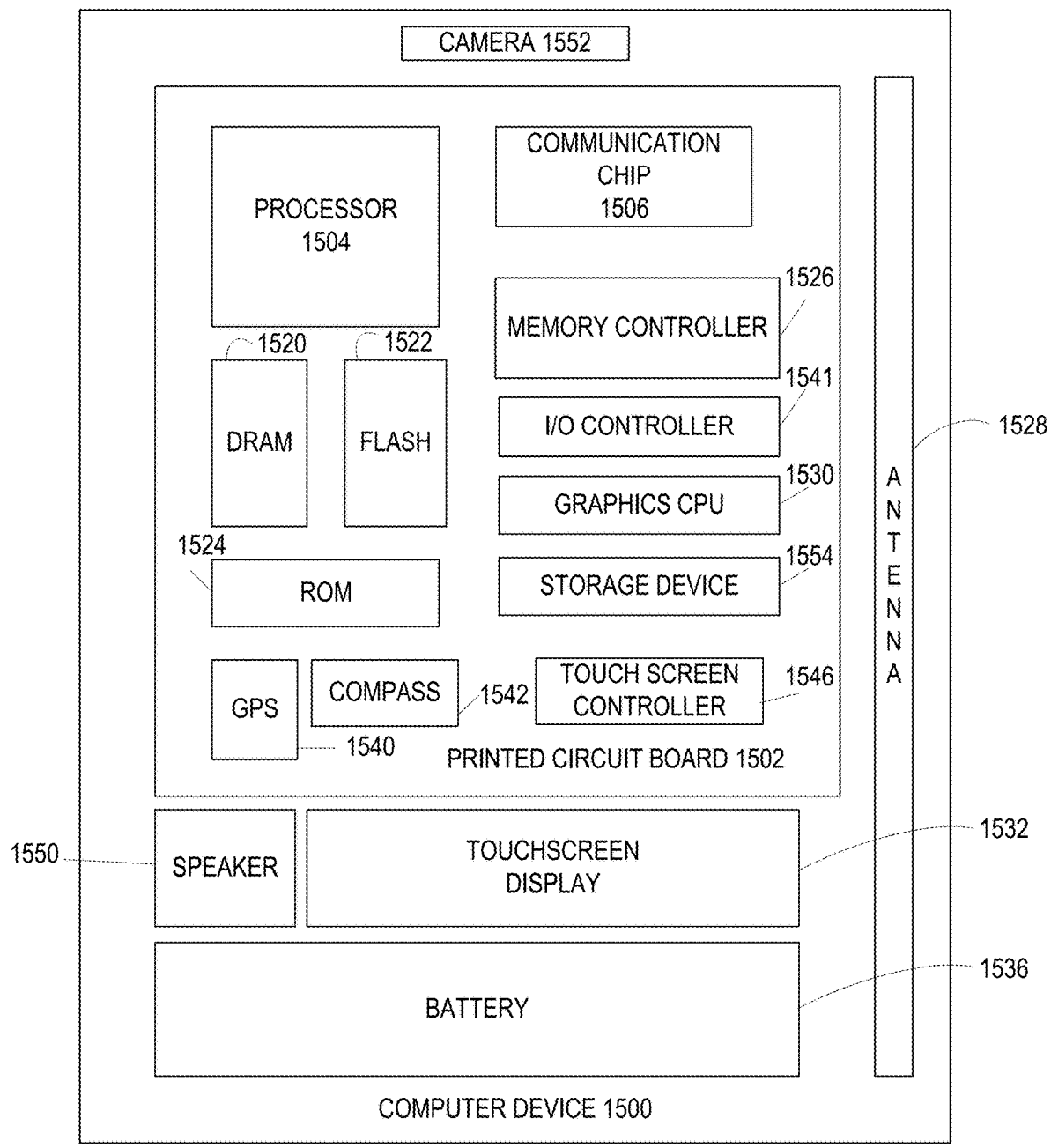
FIG. 7 is a block diagram of an example computer that can be used to implement some or all of the components of the interfaces, process flows, systems, and/or methods disclosed herein, according to various embodiments.

FIG. 7 illustrates an example architecture of a computer device 1500 that may be employed by the apparatuses and/or methods described herein, in accordance with various embodiments. It should be understood that computer device 1500 is intended to depict a generic computer architecture. Systems implementing interface 100 or interface 200, as well as components such as a control board for a chair, may have some of the components depicted in FIG. 7, omit other components, and may have additional or different components, as necessary to a given implementation.

As shown, computer device 1500 may include a number of components, such as one or more processor(s) 1504 (one shown) and at least one communication chip 1506. In various embodiments, the one or more processor(s) 1504 each may include one or more processor cores. In various embodiments, the one or more processor(s) 1504 may include hardware accelerators to complement the one or more processor cores. In various embodiments, the at least one communication chip 1506 may be physically and electrically connected to the one or more processor(s) 1504. In further implementations, the communication chip 1506 may be part of the one or more processor(s) 1504. In various embodiments, computer device 1500 may include printed circuit board (PCB) 1502. For these embodiments, the one or more processor(s) 1504 and communication chip 1506 may be disposed thereon. In alternate embodiments, the various components may be connected without the employment of PCB 1502.

Depending on its applications, computer device 1500 may include other components that may be physically and electrically coupled to the PCB 1502. These other components may include, but are not limited to, memory controller 1526, volatile memory (e.g., dynamic random access memory (DRAM) 1520), non-volatile memory such as read only memory (ROM) 1524, flash memory 1522, storage device 1554 (e.g., a hard-disk drive (HDD)), an I/O controller 1541, a digital signal processor (not shown), a crypto processor (not shown), a graphics processor 1530, one or more antennae 1528, a display, a touch screen display 1532, a touch screen controller 1546, a battery 1536, an audio codec (not shown), a video codec (not shown), a global positioning system (GPS) device 1540, a compass 1542, an accelerometer (not shown), a gyroscope (not shown), a speaker 1550, a camera 1552, and a mass storage device (such as hard disk drive, a solid state drive, compact disk (CD), digital versatile disk (DVD)) (not shown), and so forth.

In some embodiments, the one or more processor(s) 1504, flash memory 1522, and/or storage device 1554 may include associated firmware (not shown) storing programming instructions configured to enable computer device 1500, in response to execution of the programming instructions by one or more processor(s) 1504, to practice all or selected aspects of the interface 100, interface 200, process flow 400, process flow 500, and/or method 600, described herein. In various embodiments, these aspects may additionally or alternatively be implemented using hardware separate from the one or more processor(s) 1504, flash memory 1522, or storage device 1554.

The communication chips 1506 may enable wired and/or wireless communications for the transfer of data to and from the computer device 1500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 1506 may implement any of a number of wireless standards or protocols, including but not limited to IEEE 802.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computer device 1500 may include a plurality of communication chips 1506. For instance, a first communication chip 1506 may be dedicated to shorter range wireless communications such as Wi-Fi and Bluetooth, and a second communication chip 1506 may be dedicated to longer range wireless communications such as GPS, EDGE, GPRS, CDMA, WiMAX, LTE, Ev-DO, and others.

In various implementations, the computer device 1500 may be a laptop, a netbook, a notebook, an ultrabook, a smartphone, a computer tablet, a personal digital assistant (PDA), a desktop computer, smart glasses, or a server. In further implementations, the computer device 1500 may be any other electronic device that processes data.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 8 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 1602 may include a number of programming instructions 1604. Programming instructions 1604 may be configured to enable a device, e.g., computer 1500, in response to execution of the programming instructions, to implement (aspects of) interface 100, interface 200, process flow 400, process flow 500, and/or method 600. In alternate embodiments, programming instructions 1604 may be disposed on multiple computer-readable non-transitory storage media 1602 instead. In still other embodiments, programming instructions 1604 may be disposed on computer-readable transitory storage media 1602, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EEPROM or Flash memory), an optical fiber, a portable compact disc read-only memory (CD-ROM), an optical storage device, a transmission media such as those supporting the internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways.

This application is intended to cover any adaptations or variations of the embodiments discussed herein. Therefore, it is manifestly intended that embodiments be limited only by the claims and the equivalents thereof.

What is claimed is:

1. An interface for an adjustable position dental chair, comprising:
   a plurality of icons, each of the plurality of icons associated with a stored position of the dental chair, each of the plurality of icons graphically depicting the stored position; and
   a plurality of buttons, each of the plurality of buttons associated with a corresponding one of the plurality of icons,
   wherein:
      a position of the dental chair can be adjusted using the interface to select a stored position of the dental chair or to adjust the dental chair to a new position separate from the stored positions; and
      the stored position associated with each of the plurality of icons can be reprogrammed following adjusting the dental chair to the new position separate from the stored positions to store the adjusted dental chair position, with the graphical depiction of the reprogrammed icon updated to reflect the adjusted dental chair position.

2. The interface of claim 1, when one of the plurality of icons is updated to reflect the adjusted position, a corresponding icon of a second plurality of icons on a second interface is updated to reflect the adjusted position, wherein the interface is a first interface, the first interface and second interface are each connected to the dental chair, and the first interface is of a different type from the second interface.

3. The interface of claim 1, wherein the first interface causes the second interface to update the corresponding icon of the second plurality of icons by data communication through a dental chair control board.

4. The interface of claim 1, wherein each of the plurality of icons is displayed upon a touch screen, and each of the plurality of icons comprises its corresponding button.

5. The interface of claim 1, wherein each of the plurality of icons is separate from its corresponding button.

6. The interface of claim 1, wherein the interface includes a graphical representation of the position of the dental chair that updates as the dental chair position is adjusted.

7. The interface of claim 1, wherein the interface further comprises a selector to select a user profile from a plurality of stored user profiles, each of the profiles having a plurality of stored positions, and wherein selection of the user profile causes the plurality of icons to reflect the plurality of stored positions of the selected user profile.

8. The interface of claim 1, wherein one of the plurality of buttons is configured to toggle, upon each actuation, between the stored position associated with the button's corresponding icon and a current position of the dental chair.

9. A system, comprising:
   a dental chair capable of being adjusted within a range of possible positions; and
   a first interface for adjusting the dental chair within the range of possible positions, the first interface comprising:
      a first plurality of icons, each of the first plurality of icons associated with a stored position within the range of possible positions, each of the first plurality of icons graphically depicting the stored position; and
      a plurality of buttons, each of the plurality of buttons associated with a corresponding one of the first plurality of icons,
      wherein:
         a position of the dental chair can be adjusted using the first interface to select a stored position of the dental chair or to adjust the dental chair to a new position separate from the stored positions; and
         the stored position associated with each of the first plurality of icons can be reprogrammed following adjusting the dental chair to the new position separate from the stored positions to store the adjusted dental chair position, with the graphical depiction of the reprogrammed icon updated to reflect the adjusted dental chair position.

10. The system of claim 9, when one of the first plurality of icons is updated to reflect the adjusted position, a corresponding icon of a second plurality of icons on the second interface is updated to reflect the adjusted position, wherein the first interface is of a different type than the second interface, and wherein actuating one of the buttons causes the dental chair to move to the stored position associated with the button's corresponding icon.

11. The system of claim 9, wherein the first interface is a touch screen interface, and each of the first plurality of icons also functions as its corresponding button of the plurality of buttons.

12. The system of claim 10, wherein the plurality of buttons is a first plurality of buttons, and the second interface comprises a second plurality of buttons that are separate from the second plurality of icons, each of the second plurality of buttons associated with a corresponding one of the second plurality of icons.

13. The system of claim 12, wherein one of the first plurality of buttons and one of the second plurality of buttons are each configured to toggle, upon each actuation, between the stored position associated with each button's corresponding icon and a current position of the dental chair.

14. The system of claim 9, wherein the interface further comprises a selector to select a user profile from a plurality of stored user profiles, each of the profiles having a plurality of stored positions, and wherein selection of the user profile causes the plurality of icons to reflect the plurality of stored positions of the selected user profile.

15. A non-transitory computer readable medium (CRM) comprising instructions that, when executed by an apparatus, cause the apparatus to:
  display a first plurality of icons on a first interface, each of the first plurality of icons associated with a stored position of a dental chair, each of the first plurality of icons graphically depicting the stored position;
  receive one or more commands from the first interface to adjust the position of the dental chair to select a stored position of the dental chair or to adjust the dental chair to a new position separate from the stored positions;
  receive a command to store the adjusted position of the dental chair to reprogram a previously stored dental chair position;
  update the graphical depiction on one of the first plurality of icons to reflect the adjusted position separate from the previously stored dental chair positions.

16. The CRM of claim 15, wherein the first interface further comprises a plurality of buttons, each of the plurality of buttons corresponding to one of the first plurality of icons, and wherein the instructions are to further cause, when one of the plurality of buttons is actuated, the position of the dental chair to be adjusted to match the graphical depiction of the icon corresponding to the actuated button.

17. The CRM of claim 15, wherein the apparatus is the first interface, and the instructions are to cause the apparatus to update a graphical depiction on one of a second plurality of icons located on a second interface by causing the apparatus to signal the second interface that the adjusted position of the dental chair has been stored.

18. The CRM of claim 17, wherein the apparatus signals the second interface through a control board connected to the dental chair, the first interface, and the second interface.

19. The CRM of claim 15, wherein the instructions are to further cause the apparatus to:
  receive a selection of a user profile from a plurality of user profiles, each of the plurality of user profiles having a plurality of stored positions; and
cause the first plurality of icons to reflect the plurality of stored positions from the selected user profile.

20. The CRM of claim 15, wherein the instructions are to further cause the apparatus to cause one of the plurality of buttons to toggle, upon each actuation, between the stored position associated with the button's corresponding icon and a current position of the dental chair.

* * * * *